United States Patent
Ram et al.

(10) Patent No.: US 9,493,695 B2
(45) Date of Patent: Nov. 15, 2016

(54) METHOD OF ENCAPSULATING A PHASE CHANGE MATERIAL WITH A METAL OXIDE

(71) Applicants: Manoj Kumar Ram, Palm Harbor, FL (US); Chand K. Jotshi, Gainesville, FL (US); Elias K. Stefanakos, Tampa, FL (US); Dharendra Yogi Goswami, Tampa, FL (US)

(72) Inventors: Manoj Kumar Ram, Palm Harbor, FL (US); Chand K. Jotshi, Gainesville, FL (US); Elias K. Stefanakos, Tampa, FL (US); Dharendra Yogi Goswami, Tampa, FL (US)

(73) Assignee: University of South Florida, Tampa, FL (US)

( * ) Notice: Subject to any disclaimer, the term of this patent is extended or adjusted under 35 U.S.C. 154(b) by 117 days.

(21) Appl. No.: 14/159,874

(22) Filed: Jan. 21, 2014

(65) Prior Publication Data

US 2014/0197355 A1    Jul. 17, 2014

Related U.S. Application Data

(63) Continuation of application No. PCT/US2012/047165, filed on Jul. 18, 2012.

(60) Provisional application No. 61/508,896, filed on Jul. 18, 2011.

(51) Int. Cl.
| | |
|---|---|
| C09K 5/06 | (2006.01) |
| C08G 73/10 | (2006.01) |
| C08L 79/08 | (2006.01) |
| C08K 3/08 | (2006.01) |
| C08K 3/10 | (2006.01) |
| C08K 3/16 | (2006.01) |
| C08K 3/28 | (2006.01) |

(52) U.S. Cl.
CPC ........... *C09K 5/063* (2013.01); *C08G 73/1035* (2013.01); *C08K 3/08* (2013.01); *C08K 3/10* (2013.01); *C08K 3/16* (2013.01); *C08L 79/08* (2013.01); *C08K 3/28* (2013.01); *C08K 2003/0862* (2013.01)

(58) Field of Classification Search
CPC ...................................................... C09K 5/063
USPC .................................. 252/75; 427/385.5, 294
See application file for complete search history.

(56) References Cited

U.S. PATENT DOCUMENTS

| | | | |
|---|---|---|---|
| 4,708,812 A * | 11/1987 | Hatfield ........................... | 252/70 |
| 5,687,706 A * | 11/1997 | Goswami et al. ....... | 126/263.01 |
| 5,694,515 A * | 12/1997 | Goswami et al. ............ | 392/480 |
| 5,722,482 A * | 3/1998 | Buckley ........................... | 165/10 |
| 5,945,217 A * | 8/1999 | Hanrahan ...................... | 428/389 |
| 6,147,337 A * | 11/2000 | Besser ........................... | 219/730 |
| 6,197,415 B1 | 3/2001 | Holman | |
| 7,896,953 B1 * | 3/2011 | Goswami et al. .............. | 95/139 |
| 2002/0105108 A1 * | 8/2002 | Hartmann et al. ............ | 264/140 |
| 2003/0224186 A1 * | 12/2003 | Feng et al. .................... | 428/447 |
| 2004/0251122 A1 * | 12/2004 | Goswami .................. | 204/157.3 |
| 2006/0254762 A1 * | 11/2006 | Tao et al. ...................... | 165/177 |
| 2007/0202289 A1 * | 8/2007 | Kranz et al. .................... | 428/43 |
| 2008/0008858 A1 | 1/2008 | Hong et al. | |
| 2008/0230203 A1 * | 9/2008 | Christ et al. .................... | 165/10 |
| 2009/0229749 A1 * | 9/2009 | Teel .............................. | 156/310 |
| 2009/0294094 A1 * | 12/2009 | Suzuki et al. .................. | 165/10 |
| 2011/0008536 A1 * | 1/2011 | Oh .......................... | 427/213.31 |
| 2013/0105106 A1 * | 5/2013 | Goswami et al. .............. | 165/10 |
| 2013/0192792 A1 * | 8/2013 | Krakow et al. ................. | 165/10 |
| 2014/0197355 A1 * | 7/2014 | Ram et al. ...................... | 252/75 |

FOREIGN PATENT DOCUMENTS

| | | | |
|---|---|---|---|
| CA | 2423123 A1 * | 3/2002 | |
| CA | 2785256 A1 * | 7/2011 | |
| WO | WO 0224992 A1 * | 3/2002 | |

OTHER PUBLICATIONS

Agyenim, et al., 2010, "A review of materials, heat transfer and phase change problem formulation for latent heat thermal energy storage systems (LHTESS)," Renewable and Sustainable Energy Reviews, 14(2), pp. 615-628.

Al-Jandal and Sayigh, 1994, "Thermal performance characteristics of STC system with Phase Change Storage," Renewable Energy, 5(1-4), pp. 390-399.

Baran and Sari, 2003, "Phase change and heat transfer characteristics of a eutectic mixture of palmitic and stearic acids as PCM in a latent heat storage system," Energy Conversion and Management, 44(20), pp. 3227-3246.

(Continued)

*Primary Examiner* — Mark Eashoo
*Assistant Examiner* — M. Reza Asdjodi
(74) *Attorney, Agent, or Firm* — Robert J. Varkonyi; Smith & Hopen, P.A.

(57) ABSTRACT

Storage systems based on latent heat storage have high-energy storage density, which reduces the footprint of the system and the cost. However, phase change materials (PCMs), such as $NaNO_3$, NaCl, $KNO_3$, have very low thermal conductivities. To enhave the storage of PCMs, macroencapsulation of PCMs was performed using a metal oxide, such as $SiO_2$ or a graphene-$SiO_2$, over polyimide-coated or nickel-embedded, polyimide-coated pellets The macro encapsulation provides a self-supporting structure, enhances the heat transfer rate, and provides a cost effective and reliable solution for thermal energy storage for use in solar thermal power plants. $NaNO_3$ was selected for thermal storage in a temperature range of 300° C. to 500° C. The PCM was encapsulated in a metal oxide cell using self-assembly reactions, hydrolysis, and simultaneous chemical oxidation at various temperatures.

14 Claims, 15 Drawing Sheets

(56) References Cited

OTHER PUBLICATIONS

Bauer, et al., 2012, "Characterization of Sodium Nitrate as Phase Change Material," International Journal of Thermophysics, 33(1), pp. 91-104.
Cabeza, et al., 2011, "Materials used as PCM in thermal energy storage in buildings: A review," Renewable and Sustainable Energy Reviews, 15(3), pp. 1675-1695.
Chou, et al., 2002, "Organic-inorganic sol-gel coating for corrosion protection of stainless steel," Journal of Materials Science Letters, 21(3), pp. 251-255.
Farid, et al., 2004, "A review on phase change energy storage: materials and applications," Energy Conversion and Management, 45(9-10), pp. 1597-1615.
Fouda, et al., 1984, "Solar storage systems using salt hydrate latent heat and direct contact heat exchange—II Characteristics of pilot system operating with sodium sulphate solution," Solar Energy, 32(1), pp. 57-65.
Hawlader, and Zhu, 2000, "Preparation and Evaluation of a Novel Solar Storage Material: Microencapsulated Paraffin," International Journal of Solar Energy, 20(4), pp. 227-238.
Jegadheeswaran and Pohekar, 2009, "Performance enhancement in latent heat thermal storage system: A review," Renewable and Sustainable Energy Reviews, 13(9), pp. 2225-2244.
Jotshi, et al., 1992, "Solar thermal energy storage in phase change materials," SOLAR '92: American Solar Energy Society (ASES) Annual Conference Cocoa Beach, FL, pp. 174-179.
Kenisarin and Mahkamov, 2007, "Solar energy storage using phase change materials," Renewable and Sustainable Energy Reviews, 11(9), pp. 1913-1965.
Li, et al. 2012, "Fabrication and morphological characterization of microencapsulated phase change materials (MicroPCMs) and macrocapsules containing MicroPCMs for thermal energy storage," Energy, 38(1), pp. 249-254.
Medrano, et al., 2010, "State of the art on high-temperature thermal energy storage for power generation. Part 2—Case studies," Renewable and Sustainable Energy Reviews, 14(1), pp. 56-72.
Morrison and Abdel-Khalik, 1978, "Effects of phase-change energy storage on the performance of air-based and liquid-based solar heating systems," Solar Energy, 20(1), pp. 57-67.
Rabin, et al., 1995, "Integrated solar collector storage system based on a salt-hydrate phase-change material," Solar Energy, 55(6), pp. 435-444.
Regin, et al., 2008, "Heat transfer characteristics of thermal energy storage system using PCM capsules: A review," Renewable and Sustainable Energy Reviews, 12(9), pp. 2438-2458.
Tyagi, et al., 2011, "Development of phase change materials based microencapsulated technology for buildings: A review," Renewable and Sustainable Energy Reviews, 15(2), pp. 1373-1391.
Velraj, et al., 1999, "Heat Transfer Enhancement in a Latent Heat Storage System," Solar Energy, 65(3), pp. 171-180.
Zalba, et al., 2003, "Review on thermal energy storage with phase change: materials, heat transfer analysis and applications," Applied Thermal Engineering, 23(3), pp. 251-283.
International Search Report for International Application No. PCT/US2012/047165, filing date of Jul. 18, 2012, with a mailing date of Jan. 25, 2013.
Cai, et al., Novelnanocomposite materials for advanced Li-ion rechargeable batteries. Materials. 2009; 2:1205-1238.
Wu, et al., Graphene/metal oxide composite electrode materials for energy storage. Nano Energy. 2012, 1:107-131.
Janz, et al., 1979, "Physical properties data compilations relevant to energy storage. II. Molten salts: data on single and multi-component salt systems," No. NSRDS-NBS-61(Pt.2) 420p.
International Preliminary Report on Patentability for International Application No. PCT/US20121047165, filing date Jul. 18, 2012.

* cited by examiner

METHOD OF ENCAPSULATING A PHASE CHANGE MATERIAL WITH A METAL OXIDE

CROSS-REFERENCE TO RELATED APPLICATIONS

This nonprovisional application is a continuation of currently pending PCT application No. PCT/US2012/047165 filed Jul. 18, 2012, which claims priority to provisional application No. 61/508,896, entitled "Method of Encapsulating a Phase Change Material with a Metal Oxide", filed on Jul. 18, 2011, the contents of which are herein incorporated by reference.

STATEMENT OF GOVERNMENT INTEREST

This invention was made with Government support under Grant No. DE-EE0003590 awarded by the Department of Energy. The Government has certain rights in the invention.

FIELD OF INVENTION

This invention relates to thermal energy storage in phase change materials. Specifically, the invention relates to metal oxide encapsulated phase change materials.

BACKGROUND OF THE INVENTION

According to the World Bank, U.S. per capita electrical consumption has exceeded 13,000 kW. Throughout the world electricity consumption was over 20,000,000 GWh/yr in 2009. Traditional electrical generation, through use of coal and other fossil fuels, has increased, due in part to the dwindling supply of resources. Low-efficiency peaking power plants, such as gas turbines, are still employed for meeting high peak energy demands. However, the electrical generation industry has begun providing lower cost, off-peak rates to change consumer usage to times where electricity may be produced at much lower marginal cost.

Ecologically friendly electrical generation has become more common, as a means of reducing carbon emissions and reducing reliance on nonrenewable resources. Photovoltaic cells and concentrating Solar Power (CSP) are competing solar power generation technologies. CSP systems use lenses or mirrors to focus a large area of sunlight into a small beam, which is used as a heat source for a conventional power plant. A working fluid is heated by the concentrated sunlight, and is then used for power generation or energy storage.

Thermal energy storage technology saves energy, provides economic benefits, and makes possible the use of periodic energy sources, such as solar energy. Solar energy is an inexhaustible source of future energy needs with a minimum of adverse environmental consequences (Goswami, et al., 2000, Principles of Solar Engineering, Taylor and Francis Group, New York). The energy storage is one of the best possible solutions to reduce the mismatch between supply and demand. Most current solar heating systems have storage for a few hours to a day's worth of energy collected, by using thermal energy storage materials (TESMs). Thermal energy storage (TES) helps overcome the intermittency of the solar resource for concentrating solar power (CSP) plants (Dincer and Dost, 1996, "A perspective on thermal energy storage systems for solar energy applications," International Journal of Energy Research, 20(6), pp. 547-557). TES systems contains a thermal storage mass, and can be based on latent, sensible and thermo-chemical energy storage (Sharma, et al., 2009, "Review on thermal energy storage with phase change materials and applications," Renewable and Sustainable Energy Reviews, 13(2), pp. 318-345; Gil, et al., 2010, "State of the art on high temperature thermal energy storage for power generation. Part 1—Concepts, materials and modellization," Renewable and Sustainable Energy Reviews, 14(1), pp. 31-55).

Among these energy storage types, latent heat storage in phase change materials (PCMs) is very attractive because of high storage capacity and charging/discharging heat at a nearly constant temperature, require little maintenance, can be produced at a range of temperatures, and are easy to integrate into a power plant (Abhat, "Performance studies of a finned heat pipe latent thermal energy storage system," Proc. Mankind's future source of energy; Proceedings of the International Solar Energy Congress, Pergamon Press, Inc., New Delhi, India, pp. 541-546). There are several studies on storing solar thermal energy using PCMs (Zalba, et al., 2003, "Review on thermal energy storage with phase change: materials, heat transfer analysis and applications," Applied Thermal Engineering, 23(3), pp. 251-283; Al-Jandal and Sayigh, 1994, "Thermal performance characteristics of STC system with Phase Change Storage," Renewable Energy, 5(1-4), pp. 390-399; Baran and Sari, 2003, "Phase change and heat transfer characteristics of a eutectic mixture of palmitic and stearic acids as PCM in a latent heat storage system," Energy Conversion and Management, 44(20), pp. 3227-3246; Fouda, et al., 1984, "Solar storage systems using salt hydrate latent heat and direct contact heat exchange—II Characteristics of pilot system operating with sodium sulphate solution," Solar Energy, 32(1), pp. 57-65; Morrison and Abdel-Khalik, 1978, "Effects of phase-change energy storage on the performance of air-based and liquid-based solar heating systems," Solar Energy, 20(1), pp. 57-67; Rabin, et al., 1995, "Integrated solar collector storage system based on a salt-hydrate phase-change material," Solar Energy, 55(6), pp. 435-444; Velraj, et al., 1999, "Heat Transfer Enhancement in a Latent Heat Storage System," Solar Energy, 65(3), pp. 171-180; Medrano, et al., 2010, "State of the art on high-temperature thermal energy storage for power generation. Part 2—Case studies," Renewable and Sustainable Energy Reviews, 14(1), pp. 56-72; Jotshi, et al., 1992, "Solar thermal energy storage in phase change materials," SOLAR '92: American Solar Energy Society (ASES) Annual Conference Cocoa Beach, Fla., pp. 174-179). Stored solar thermal energy has the potential to provide cheaper peak-demand power than any other energy source. In addition, there are also a number of seasonal thermal stores, which store summer energy for space heating during winter.

PCMs store heat using solid-solid, solid-liquid, solid-gas and liquid-gas phase change, though only solid-liquid change is used in PCMs for electrical generation and thermal energy storage. Solid-liquid PCMs increase in temperature as they absorb heat, until PCM reaches the phase change temperature (melting temperature). At the phase change, the PCM absorbs large amounts of heat with minimal temperature change, until the material has transformed phase. When the ambient temperature around a liquid material falls, the PCM solidifies, releasing its considerable amount of latent energy. PCMs are widely used in the art because of the high energy storage density associated with the change of phase. PCM storage systems also have an advantage of being capable to operate with small temperature differences between charging and discharging.

In a latent heat energy storage system, selection of the PCM is a very important task. Most investigations are focused on salt hydrates, paraffin's, non-paraffin's, inorganic acids, clathrates and eutectic organic and inorganic compounds (Lane, 1986, Solar Heat Storage: Latent Heat Materials, CRC Press, Inc, Boca Raton, Fla.). For example, Lane (Lane, 1986, Solar Heat Storage: Latent Heat Materials, CRC Press, Inc, Boca Raton, Fla.) has compiled a list of the common PCMs for various applications. Inorganic compounds, in general, have a higher latent heat per unit volume and are non-flammable, and have lower costs in comparison to organic compounds (Tyagi, et al., 2011, "Development of phase change materials based microencapsulated technology for buildings: A review," Renewable and Sustainable Energy Reviews, 15(2), pp. 1373-1391; Agyenim, et al., 2010, "A review of materials, heat transfer and phase change problem formulation for latent heat thermal energy storage systems (LHTESS)," Renewable and Sustainable Energy Reviews, 14(2), pp. 615-628).

Many PCM systems rely on molten salt to retain the temperature. Molten salt can be employed as a thermal energy storage method to retain thermal energy collected by a solar tower or solar trough so that it can be used to generate electricity in bad weather or at night. With concentrated solar power, the PCMs have been successfully utilized in electricity generation, to allow solar power to provide electricity on a continuous basis, such as Solar One, Two, and Tres. These molten salts, like potassium nitrate, calcium nitrate, sodium nitrate, lithium nitrate, absorb and store the heat energy that is later released when electricity is needed by pumping the hot salt to a conventional steam-generator to produce superheated steam for a turbine/generator.

However, there are some problems associated with PCMs. Salt based PCM solutions must be encapsulated to prevent water evaporation or uptake. One of the most significant drawbacks is that these materials have very low heat transfer characteristics, and tend to solidify at the edges of the encapsulating container and preventing effective heat transfer. Moreover, inorganic PCMs, in general, have low thermal conductivity (0.1-0.6 W/m. K), leading to low heat transfer rates and oxidation on exposure to heat transport medium (air or heat transfer fluids like oils). In order to overcome such problems, heat transfer enhancement techniques, such as use of extended surfaces and dispersion of high conductivity materials, have been identified and applied (Jegadheeswaran and Pohekar, 2009, "Performance enhancement in latent heat thermal storage system: A review," Renewable and Sustainable Energy Reviews, 13(9), pp. 2225-2244). Another technique to overcome the low heat transfer is to encapsulate the PCM within a secondary supporting structure, and use of these capsules in a packed/fluidized bed heat exchanger (Hawlader, and Zhu, 2000, "Preparation and Evaluation of a Novel Solar Storage Material: Microencapsulated Paraffin," International Journal of Solar Energy, 20(4), pp. 227-238).

No commercially available heat storage products possess heat transfer enhancement capabilities which would improve performance of low temperature devices. Enhancement of heat transfer in heat storage devices with a PCM typically use fins and Lessing rings from various materials and carbon fibers (Kenisarin and Mahkamov, 2007, "Solar energy storage using phase change materials," Renewable and Sustainable Energy Reviews, 11(9), pp. 1913-1965). The disadvantage of their heat exchanger development is increasing the cost and complexity of thermal energy storage devices. In order to solve these problems, both material investigation and heat exchanger development were performed. Based on the investigation of studies focused on both the cases, it was observed and reported that one of the effective techniques is to encapsulate the PCM within a secondary supporting structure, and apply the packed/fluidized bed heat exchanger for better heat transfer enhancement (Hawlader and Zhu, 2000, "Preparation and Evaluation of a Novel Solar Storage Material: Microencapsulated Paraffin," International Journal of Solar Energy, 20(4), pp. 227-238). Since the progress of latent heat storage systems mainly depends on assuring a high effective heat transfer rate to allow rapid charging and discharging, the required heat transfer surfaces should be large to maintain a low temperature gradient during these processes. This can be achieved efficiently through the macroencapsulation.

Macroencapsulated PCMs refer to capsules larger than 1 mm (Li, et al., 2012, "Fabrication and morphological characterization of microencapsulated phase change materials (MicroPCMs) and macrocapsules containing MicroPCMs for thermal energy storage," Energy, 38(1), pp. 249-254). PCM macrocapsules are generally made by filling the PCM in preformed shells such as tubes, pouches, spheres, panels or other receptacles and sealing them (Cabeza, et al., 2011, "Materials used as PCM in thermal energy storage in buildings: A review," Renewable and Sustainable Energy Reviews, 15(3), pp. 1675-1695). The most cost-effective containers are plastic bottles (high density and low density polyethylene and polypropylene bottles for low temperature storage), tin-plated metal cans and mild steel cans (Regin, et al., 2008, "Heat transfer characteristics of thermal energy storage system using PCM capsules: A review," Renewable and Sustainable Energy Reviews, 12(9), pp. 2438-2458; Bauer, et al., 2012, "Characterization of Sodium Nitrate as Phase Change Material," International Journal of Thermophysics, 33(1), pp. 91-104; Farid, et al., 2004, "A review on phase change energy storage: materials and applications," Energy Conversion and Management, 45(9-10), pp. 1597-1615; Chou, T. P., Chandrasekaran, C., Limmer, S., Nguyen, C., and Cao, G. Z., 2002, "Organic-inorganic sol-gel coating for corrosion protection of stainless steel," Journal of Materials Science Letters, 21(3), pp. 251-255).

While these problem may be overcome by microencapsulation or molecular-encapsulation of PCMs, the encapsulation process may be expensive and difficult. Therefore, what is needed is a thermal energy storage material composition which permits effective heat transfer, without unyielding encapsulation.

SUMMARY OF INVENTION

Low cost thermal energy storage is essential for solar power to become viable in large capacities. The following are important features of a good thermal storage system: high energy density, good heat transfer, a mechanically and chemically stable storage medium, and minimum thermal losses. PCMs create an opportunity for storing large amounts of thermal energy in a small amount of material, thus significantly reducing the costs. As such, a thermal energy storage material, which comprises an inorganic phase changing salt pellet, such as a PCM listed in Table 1, encapsulated in a metal oxide. $NaNO_3$ and other PCMs for use in a CSP application in the temperature range from 300-400° C. may be used. The phase changing salt pellet is optionally cylindrical, spherical or oblong. However, other shapes would be known to one skilled in the art, with the advantages and disadvantages of different geometries of PCM encapsulation with different materials and their compatibility are discussed in the published literature (Zalba, et al., 2003, "Review on thermal energy storage with phase change: materials, heat transfer analysis and applications,"

Applied Thermal Engineering, 23(3), pp. 251-283; Farid, et al., 2004, "A review on phase change energy storage: materials and applications," Energy Conversion and Management, 45(9-10), pp. 1597-1615). In some variations the cylindrical pellet has a porosity of 1% to 5%, and the spherical pellet has a porosity of 22 to 29%. The macroencapsulated PCMs provides a self-supporting structure, and protects it from heat transfer fluids.

TABLE 1

List of PCM salts and their corresponding melting temperatures.

| PCM salt | MT (° C.) |
|---|---|
| aluminum phosphate | 1800 |
| ammonium carbonate | 58 |
| ammonium chloride | 338 |
| caesium carbonate | 610 |
| caesium sulfate | 645 |
| calcium citrate | 120 |
| calcium chloride | 1935 |
| calcium hydroxide | 580 |
| calcium oxide | 2572 |
| calcium phosphate | 109 |
| calcium saccharate | 250 |
| calcium sulfate | 1460 |
| cerium phosphate |  |
| iron phosphate | 500 |
| lithium carbonate | 723 |
| lithium sulfate | 859 |
| magnesium chloride | 714 |
| magnesium sulfate | 1124 |
| manganese chloride | 654, 135* |
| manganese nitrate | 37 |
| manganese sulfate | 710 |
| potassium acetate | 292 |
| potassium carbonate | 891 |
| potassium chloride | 770 |
| potassium phosphate | 252.6, 465† |
| rubidium carbonate | 837 |
| rubidium sulfate | 1074 |
| disodium tetraborate | 743 |
| sodium acetate | 324, 58** |
| sodium bicarbonate | 851 |
| sodium bisulfate | 315, 58.5# |
| sodium bicarbonate | 851, 100# |
| sodium citrate | 300 |
| sodium chloride | 801 |
| sodium hydroxide | 318 |
| Sodium nitrate | 308 |
| sodium percarbonate |  |
| sodium persulfate | 180 |
| sodium phosphate | 73.3-76.7 |
| sodium propionate | 289 |
| sodium selenite | 710 |
| sodium silicate | 1088 |
| sodium sulfate | 884 |
| sodium tellurate | 710 |
| sodium thiosulfate | 48.3 |
| strontium hydrophosphate | 400 |
| zinc acetate | 237 |
| zinc chloride | 292 |
| sodium thiosulfate | 48.3 | monohydrate variant of composition
*dihydrate variant of composition
**trihydrate variant of composition
†dipotassium variant The phase changing salt pellet is optionally surface functionalized, through hexane and silane functionalization.

The phase changing salt pellet optionally includes a void space within the phase changing salt pellet, permitting the phase change material additional space during melting. For example, the void space is optionally between about 15 to about 35% of the size of the phase changing salt pellet, and can optionally be evacuated of ambient air.

Because the PCMs melt during heat absorption, a high temperature polymer, such as a polyimide stable at temperatures of over 500° C., is coated over the exterior surface of the phase changing salt pellet. In some variations, the polyimide coating also includes an additive, such as a nickel, silicon carbide, or carbon. A metal oxide or graphene-metal oxide composite encapsulant is disposed on the exterior of the polyimide coating.

Metal oxide encapsulants include silicon dioxide, titanium dioxide, zinc oxide, calcium oxide, barium oxide, titanium dioxide-silicon dioxide composite, cerium dioxide, iron (III) trioxide, aluminum (III) oxide, magnesium oxide, lithium cobalt dioxide, lithium nickel dioxide, zinc oxide, zirconium dioxide, lithium, titanium oxide, lithium aluminum manganese oxide, lithium nickel manganese oxide, lithium dimanganese tetraoxide, indium tin oxide, or combinations thereof. The encapsulant optionally includes grapheme in the metal oxide as a composite. Graphene is a one-atom-thick sheet of $sp^2$-bonded carbon atoms in a honeycomb crystal lattice, which is a current focus of materials science and condensed matter physics research (Wu, et al. Graphene/metal oxide composite electrode materials for energy storage. Nano energy. 2012(1); 107-131). It is the thinnest known material in the world and conceptually a basic build block for constructing many other carbon materials. It can be rolled into one-dimensional carbon nanotubes (CNTs), and stacked into three-dimensional (3D) graphite. With the addition of pentagons it can be wrapped into a spherical fullerene. As a consequence of its crystal structure, any low-energy quasiparticles in the material obey a linear dispersion relation. Graphene has the fastest electron mobility of ~15,000 $cm^2 V^{-1} cm^{-1}$ or $10^6$ Ωcm, a super high mobility of temperature-independent charge, and superior thermal conductivity of 5000 $W m^{-1} K^{-1}$.

The present invention is a novel, nonobvious, and useful method of encapsulating widely-available low-cost PCMs on a level scalable for mass manufacturing. The invention provides a cost-effective and reliable solution for thermal energy storage. The thermal energy storage material is manufactured using an inorganic phase changing salt pellet, such as a PCM or other phase changing salt noted above or below. The phase changing salt is optionally formed into a pellet using power press a pelletizer, or wet granulation. In wet granulation the pellet is formed through agglomeration. A liquid solution or a granulating fluid was added to powders resulting in the massing of a mix of dry primary powder particles to form large sized particles. The fluid contains a solvent which must be non-toxic yet volatile so that it can be removed by drying. Typical liquids include water, ethanol and isopropanol either alone or in combination. In the power press method, which is similar to the briquetting process, dry powder is pressed between dies to produce pellets of required shape and size. Alternatively, the briquetting method may be used to form the pellet. One advantage of this method is that it does not require binders and hence is suitable for PCMs that are hygroscopic. Optional formed shapes include cylindrical, spherical, and oblong, though other shapes are envisioned. Optionally, a void space was formed in the phase changing salt pellet prior to polyimide coating, such as by drilling, briquetting, die casting the pellet with a void space, or any other means known in the art. Where a void space was formed, the void space was optionally evacuated of ambient air or pressure in the void space reduced by inserting a metal wire into the phase changing salt pellet during fabrication of the pellet, heating the phase changing salt pellet, removing the metal wire from the phase changing salt pellet, permitting heated gases to escape from the void space, and applying the polyimide coating to the phase changing salt pellet to seal the void space. The surface of the phase changing salt pellet was optionally functionalized by soaking the phase changing salt pellet in a solution of hexane and silane for 24 hours prior to applying the polyimide coating to the phase changing salt pellet.

The exterior of the phase changing salt pellet was coated in a high temperature polymer, like polyimide. In some variations, the polyimide was mixed with N-methyl 2-pyrrolidinone and a plasticizer organic solvent and applied in a thin layer onto the phase changing salt pellet by dip coating, spray coating or brushing. The polyimide optionally includes additives, such as nickel, silicon carbide, or carbon, and the polyimide cured, for example at up to 250° C. for 2 hours.

The exterior of the polyimide coating was then encapsulated with a metal oxide or a graphene-metal oxide composite. Exemplary metal oxide encapsulants include silicon dioxide, titanium dioxide, zinc oxide, calcium oxide, barium oxide, titanium dioxide-silicon dioxide composite, cerium dioxide, iron (III) oxide, aluminum (III) oxide, magnesium oxide, lithium cobalt dioxide, lithium nickel dioxide, zinc oxide, zirconium dioxide, lithium, titanium oxide, lithium aluminum manganese oxide, lithium nickel manganese oxide, lithium dimanganese tetraoxide, indium tin oxide, or combinations thereof. In some variations, a metal oxide precursor, such as a sol-gel silicon dioxide precursor like tetraethyl orthosilicate or tetraethyl orthosilicate containing grapheme, is obtained and mixed with 3-aminopropyltriethoxy silane to form a silicate precursor, and polyimide-coated phase changing salt pellets placed into the silicate precursor. The silicate precursor is heated, ethanol and hydrochloric acid added to the silicate precursor, the silicate precursor neutralized with sodium hydroxide, and the sol-gel silicon dioxide precursor encapsulated on the polyimide coated phase changing salt pellet. The metal oxide coating is optionally cured at various temperatures ranging up to 250° C., such as 250° C. at a rate of 4° C./minute for two hours, thereby forming a $SiO_2$ shell on the pellet through self-assembly, hydrolysis, and simultaneous chemical oxidation at various temperatures.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
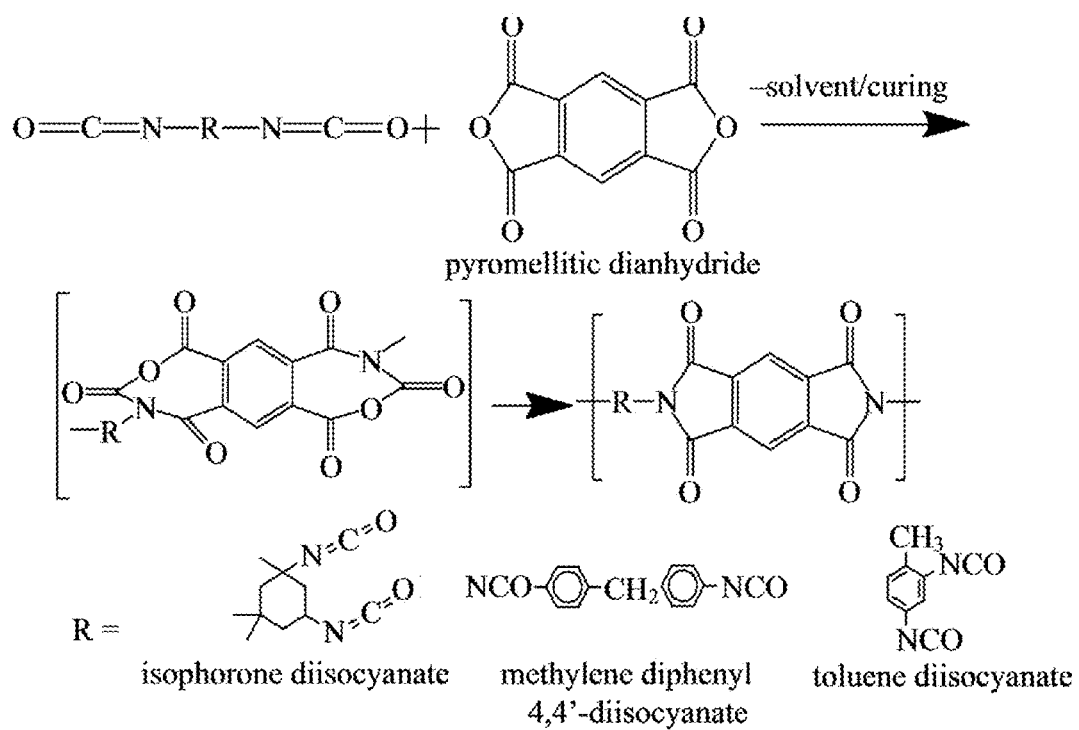
FIG. 1 is a schematic of PI formation on the phase change material pellet.

Provided herein is a thermal energy storage system with tunable operating range, such as 300° C.-450° C. for $NaNO_3$, based on encapsulated phase change materials (PCM) that can meet the utility-scale base-load concentrated solar power plant requirements at much lower system costs compared to the existing thermal energy storage (TES) concepts. Encapsulation of PCMs with a metal oxide contributes in achieving high temperature performance (300° C.-500° C.) with cyclic performance capability. Suitable encapsulation methods were developed for existing low-cost phase change materials that provide a cost-effective and reliable solution for thermal energy storage to be integrated in solar thermal power plants. The novel technique of macro encapsulation provides a self-supporting structure to the phase change material, and separates it from heat transfer fluids and also increases the heat transfer rate.

As used herein, "about" means approximately or nearly and in the context of a numerical value or range set forth means ±15% of the numerical.

As used herein, "complementary" means the elements are sized and shaped to allow at least one element from one complementary half to engage at least one element from the opposing complementary half.

As used herein, "evacuated of ambient air" means a pressure below the ambient, atmospheric pressure. Exemplary pressures may be low, medium, or high vacuum, as seen in Table 2.

TABLE 2

Pressure values for various vacuum states.

| | Pressure (Torr) | Pressure (Pa) |
|---|---|---|
| atmosphereic pressure (no vacuum) | 760 | $1.013 \times 10^6$ |
| low vacuum | 760 to 25 | $1.0 \times 10^6$ to $3 \times 10^3$ |
| medium vacuum | 25 to $1 \times 10^{-3}$ | $3 \times 10^3$ to $1.0 \times 10^{-3}$ |
| high vacuum | $1 \times 10^{-3}$ to $1 \times 10^{-9}$ | $1.0 \times 10^{-3}$ to $1.0 \times 10^{-6}$ |

As used herein, "graphene: is a one-atom-thick planar sheet of sp-bonded carbon oriented in a honeycomb crystal lattice.

As used herein, "oblong" means an elongated cylindrical or spherical shape. A nonlimiting example is an ovoid shape.

As used herein, "phase changing salt" is an inorganic salt, salt hydrate, or eutectic having a high heat of fusion at its melting temperature.

As used herein, "porosity" means the spaces in a material that is not occupied by the material. Such void space is typically occupied by other materials, such as ambient air or other gases. The porosity is a percentage of the volume of void space over the total volume.

As used herein, "surface functionalized" means a surface modified from its natural state through treatment.

Example 1

$NaNO_3$ was used because of its low cost and significantly high latent heat compared to other PCMs that melt at similar temperatures of between 300 and 400° C. (Bauer, et al., 2012, "Characterization of Sodium Nitrate as Phase Change Material," International Journal of Thermophysics, 33(1), pp. 91-104). $NaNO_3$ was formed into cylindrical TESM pellets using appropriate dies in a bench top power press (ranging from 13 to 30 mm diameter). Porosity of the cylindrical pellets varied with the pressure applied in the press and the diameter of the die, from 1 to 5% depending on the size and pressure applied. All the measurements of porosity were performed with the aid of Sartorius YDK01MS apparatus.

Encapsulation of PCMs with a metal oxide ($SiO_2$) contributes in achieving high temperature performance (300 to 500° C.) with cyclic performance capability. A technique was developed to self-assemble a $SiO_2$ layer over the pellets (Chou, et al., 2002, "Organic-inorganic sol-gel coating for corrosion protection of stainless steel," Journal of Materials Science Letters, 21(3), pp. 251-255). This layer encapsulates the PCM, which separates the PCM from the heat transfer fluid, and provides the required strength to the capsules. However, the self-assembly process involves different solvents, which may affect the pellet characteristics.

As such, a precursor is coated initially on the pellet to protect the salt from dissolving. The reactivity of the solution with the molten $NaNO_3$ plays an important role, keeping in mind the sustainability of the $NaNO_3$ capsules over a large number of heating and cooling cycles. An intermediate PI coating renders the $NaNO_3$ pellets insoluble in water and other solvents like ethanol, isopropyl alcohol, ether, acetonitrile, acetone etc. A high temperature polymer polyimide (PI) was coated onto the $NaNO_3$ pellets, and cured so that the pellet becomes insoluble in water as well as in several organic solvents. An issue arises with the physical characteristics of PI and $NaNO_3$, because $NaNO_3$ is usually hydrophilic, whereas the PI is hydrophobic. Hence the interaction between these two oppositely characterized substances deteriorates the quality of the coatings. To avoid this problem, the $NaNO_3$ pellets were soaked in a solution of hexane and silane at a ratio of 1:10, 1:20, or 1:30 ratio for 24 hours, for example at 1:10. This process of silanization not only turns the $NaNO_3$ substrate hydrophobic but also helps to cover the pores over the $NaNO_3$ pellets. This increases the ability of spreading of PI over the $NaNO_3$ substrates and provides a more uniform PI coating, as the surface pores of the pellet were then covered prior to PI coating. The PI was then either dip coated or applied with brush over the pellets. Owing to the high viscosity, PI cannot be sprayed. The curing process involved air drying for 1 hour, followed by heating the pellet to 250° C. at a rate of 4° C./minute and dwelling for 2 hours at 250° C., thereby forming an intermediate layer of PI as seen in FIG. 1. $NaNO_3$ pellets coated with PI after the silanization process were completely impervious.

Figure 2:
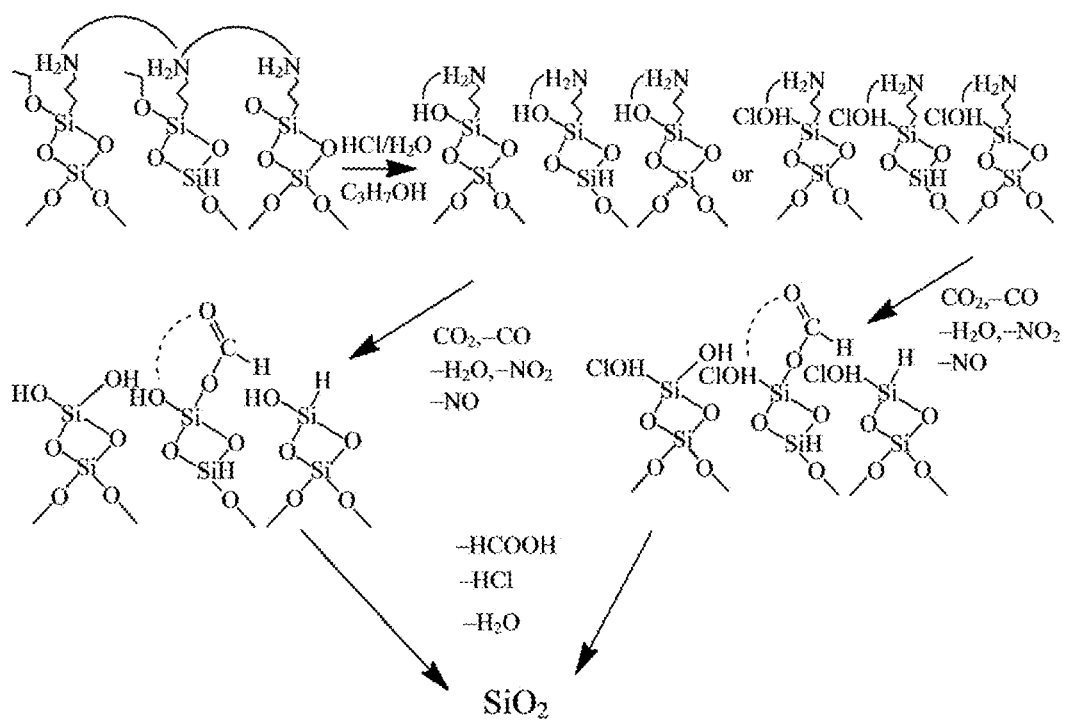
FIG. 2 is an illustration of the $SiO_2$ coating formed over the PI substrate.
Figure 3:
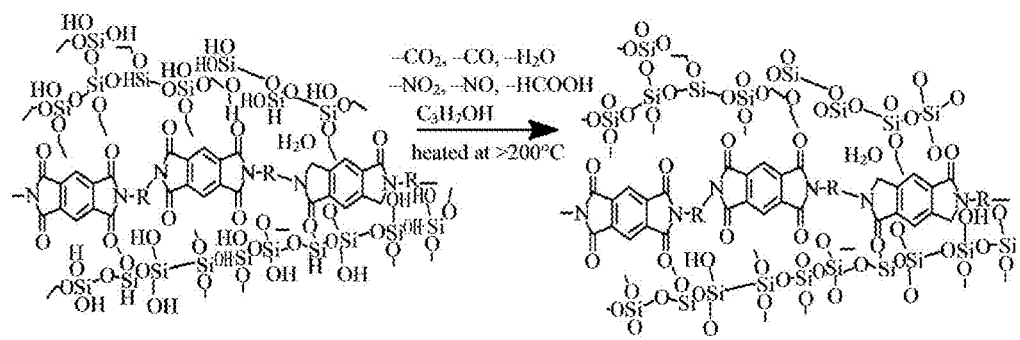
FIG. 3 is an illustration of the PI and $SiO_2$ coating after integration of both over the pellet.

A technique was developed to self-assemble a $SiO_2$ layer over the PI coated pellets (Chou, T. P., Chandrasekaran, C., Limmer, S., Nguyen, C., and Cao, G. Z., 2002, "Organic-inorganic sol-gel coating for corrosion protection of stainless steel," Journal of Materials Science Letters, 21(3), pp. 251-255), providing the additional strength required for encapsulation. Tetraethyl orthosilicate (TEOS), silane, ethanol, hydrochloric acid (HCl, 0.25 M), sodium hydroxide (NaOH, 1M) were used in developing the $SiO_2$ coating. Initially, TEOS was added to silane, and mixed thoroughly. The ethanol, sodium hydroxide and hydrochloric acid were kept separately in different beakers. Due to the presence of silane, the TEOS self-assembled on the $NaNO_3$ pellets using secondary coatings of PI or Ni nanoparticles+PI. The $NaNO_3$ pellets, in TEOS-silane solution, were heated at 200° C. on a hot plate, which wetted the pellets. The TEOS and silane mixture was immediately treated by alcohol combined with HCl, which hydrolyzed the TEOS immediately at high temperature. After 5 to 10 minutes, the pellets were treated with NaOH, and immediately transferred to a hot environment (250° C.) using ambient atmosphere. A continuous reaction occurred at the molecular level between NaOH, alcohol and TEOS; as a result of which $Si(OH)_4$, and later $SiO_2$ were formed. The surface reactions occurring during the formation of $SiO_2$ in the presence of silane are seen by FIGS. 2 and 3. A thin crust of $SiO_2$ layer with white color developed over the $NaNO_3$ pellets which had prior PI and Ni-nanoparticle coatings and a pellet with the respective coatings.

Figure 4:
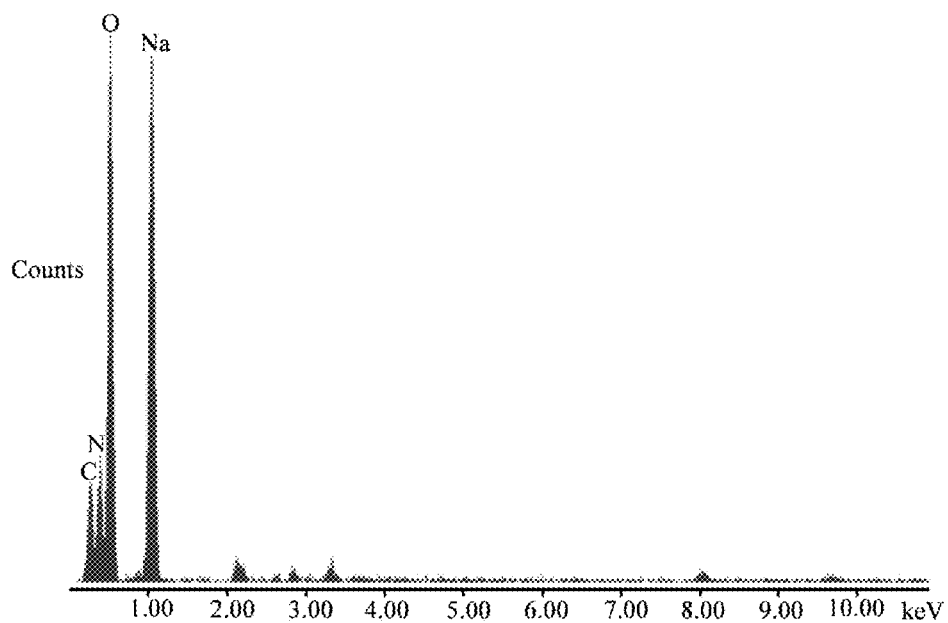
FIG. 4 is a graph of an EDX of $NaNO_3$ with 3 layers of coating.
Figure 5:
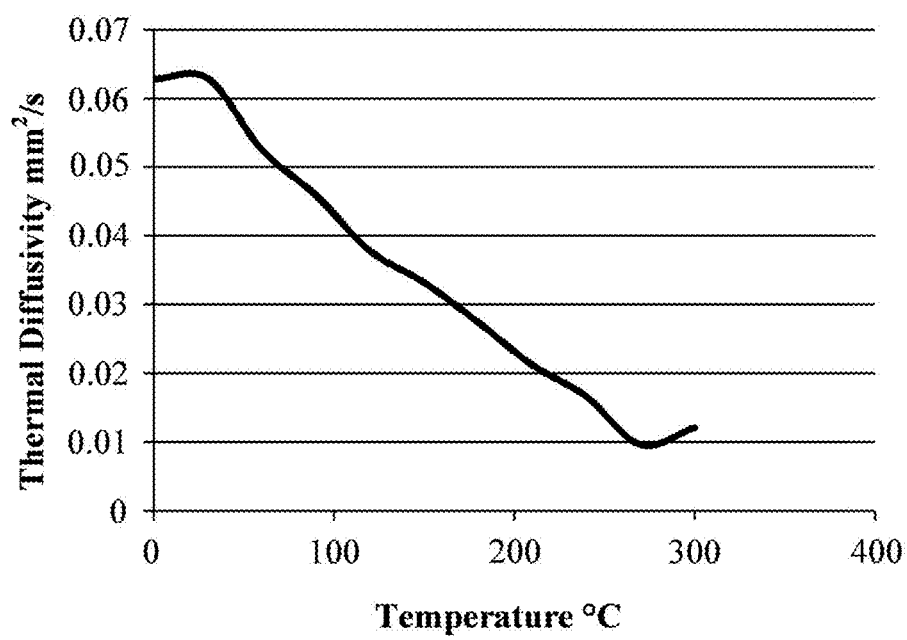
FIG. 5 is a graph showing the thermal Diffusivity of $NaNO_3$.
Figure 6:
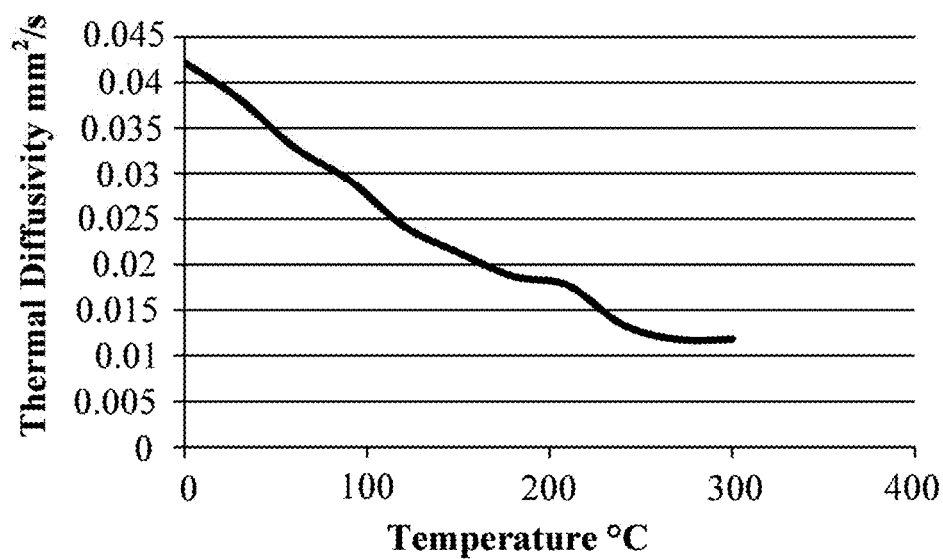
FIG. 6 is a graph showing the thermal Diffusivity of the $NaNO_3$ pellet with precursor (PI) coating.

FIG. 4 shows an EDX of the encapsulated $NaNO_3$ pellet with silica coating. Thermal diffusivity of $NaNO_3$ (industrial grade) and the $NaNO_3$ pellet with precursor coating were measured using the Linseis xenon flash thermal constant analyzer, XFA 500 that has an accuracy of ±6%, seen in FIGS. 5 and 6. The accuracy of the apparatus was verified by a standard graphite sample before and after the measurements.

Example 2

$NaNO_3$ is used as a PCM, and was formed into TESM pellets. Spherical pellets of different diameters (2 mm to 10 mm) were formed using the Mars Minerals disc pelletizer. The porosity of the spherical pellets obtained from the pelletizer varied from 22 to 29%. All the measurements of porosity were performed with the aid of Sartorius YDK01MS apparatus.

Spherical pellets were alternatively made by agglomeration in a rotating drum. Water was sprayed at spaced intervals to help the powder form into balls as the drum rotated. However, little control over porosity and size of the pellet was provided by this method.

As disclosed in Example 1, above, a high temperature polymer polyimide (PI) was coated onto the $NaNO_3$ spherical pellets by dip coating or brush application. The PI was cured by air drying for 1 hour, followed by heating the pellet to 250° C. at a rate of 4° C./minute and dwelling for 2 hours at 250° C., as disclosed above. The $SiO_2$ layer was added to the pellets for encapsulation, using tetraethyl orthosilicate (TEOS), silane, ethanol, hydrochloric acid (HCl, 0.25 M), sodium hydroxide (NaOH, 1M). A mix of TEOS and silane was added to the $NaNO_3$ pellets, and heated to 200° C. on a hot plate. Alcohol was added to the TEOS and silane mixture, hydrolyzing the TEOS, and the pellets treated with NaOH. The spherical pellets were immediately transferred to 250° C., oxidizing the later to form $SiO_2$.

Example 3

Uniform coating of the phase change material pellet directly controls the stability of the pellet during cyclic heating. The $SiO_2$ coatings initially produced were occasionally highly non-uniform. Highly viscous liquids, like PI, create difficulty in uniform application over $NaNO_3$ pellets. Dip coating the precursor solution was found to product extra solution over the $NaNO_3$ pellets, which would protrude from the pellet after curing. During the curing process, the viscosity of the solution reduces as the temperature increases and excess solution drips down the $NaNO_3$ pellets. Hence a thorough application of the right amount of precursor solution is required.

Another concern which is identified to play an important role in determining the uniformity of $SiO_2$ coating role is surface roughness of the substrates. More rough surfaces are preferred in providing the uniform coatings. As the smooth PI coatings gives rise to non-uniform coatings, silicon carbide (SiC) is mixed with PI as an additive and the coating applied over the $NaNO_3$ pellets to roughen the surface. At the lab scale the PI was applied over $NaNO_3$ pellets by smearing with hand or brush. In order to ensure PI doesn't adhere to the substrate during the curing process, Teflon substrate is used for curing. Also, during the curing process, i.e., heating to the pellets at 250° C. at the rate of 4° C. per min, the $NaNO_3$ pellet was rolled over the Teflon sheets so that the PI doesn't stick on the substrates and it gets coated uniformly. Instead of rolling the $NaNO_3$ pellet over Teflon sheets another method considered was to give multiple coatings of PI over the $NaNO_3$ pellets. Increasing the surface roughness of the substrates through use of SiC aided in providing more uniform coatings. The SiC also provided an extra advantage by giving additional strength to the encapsulating shell. Hence, SiC (20 to 100% wt. of PI) is used as an additive in PI.

Example 4

The effectiveness of the phase change material encapsulation is the void space, which provides for thermal expansion of PCM. Because $NaNO_3$ pellets obtained from the power press possess porosity of only 1 to 5% (depending on the force applied and the dimensions of the pellet), the volume change of sodium nitrate from the solid phase to the liquid phase is reported to be about 10.7% (Janz, G. J., Allen, C. B., Bansal, N. P., Murphy, R. M., and Tomkins, R. P. T., 1979, "Physical properties data compilations relevant to energy storage. II. Molten salts: data on single and multi-component salt systems," No. NSRDS-NBS-61(Pt.2) 420 p). Therefore, it is necessary to prepare the $NaNO_3$ pellets with enough void space to take care of the expected volume change.

Figure 7:
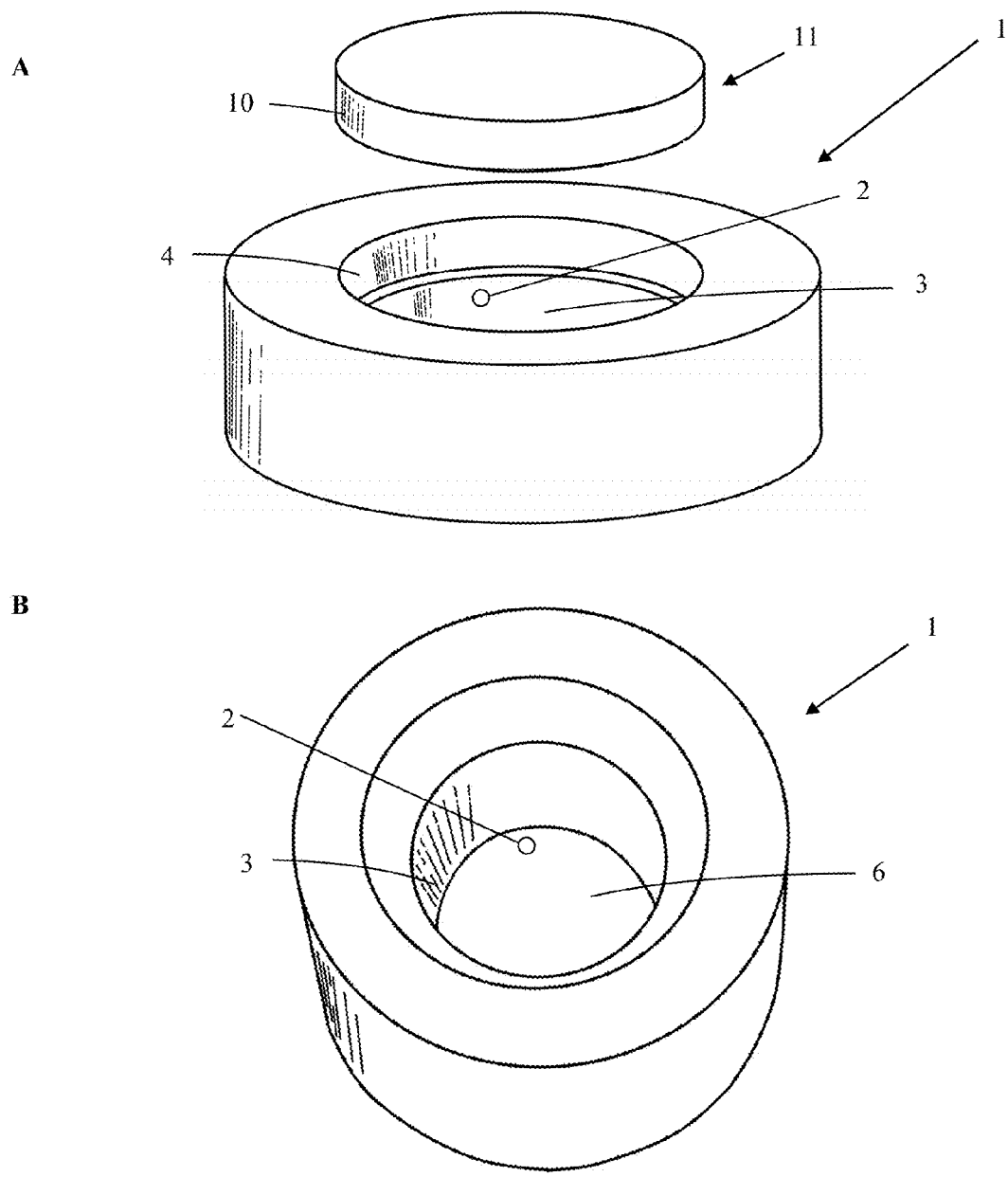
FIGS. 7(a) and (b) are illustration of phase change materials pellets containing voids. The voids provide for volumetric expansion space.
Figure 8:
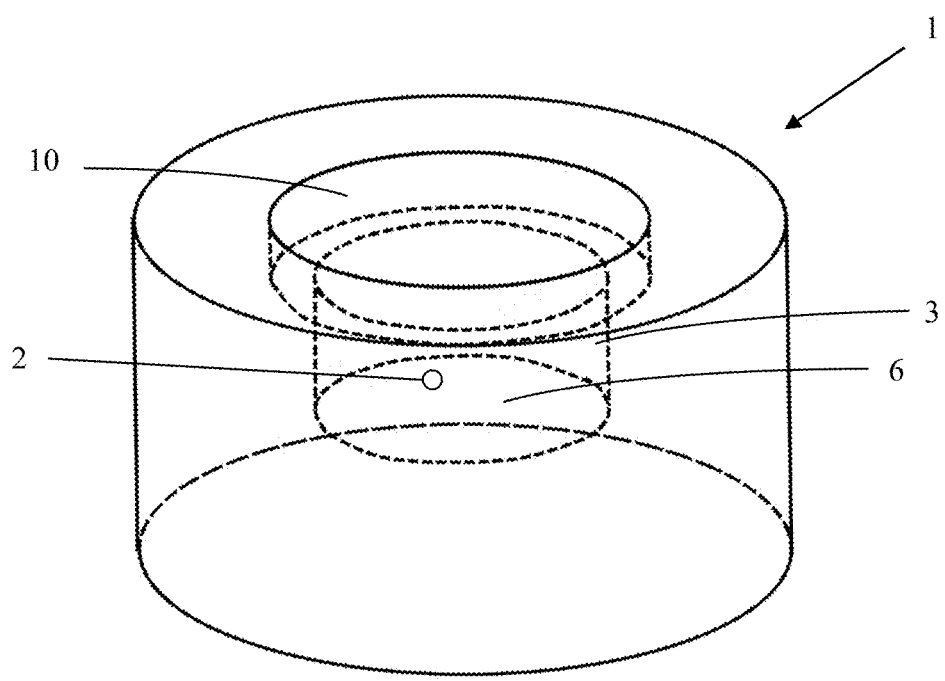
FIG. 8 is an illustration of phase change materials pellets containing voids with a pin-hole formed in the one face to provide an evacuated void. The voids provide for volumetric expansion space.

To address the volumetric expansion during the phase change, an extra void space of between 15 to 35%, was created by drilling holes in cylindrical pellets using endmills or a briquetting process. This provided an extra space to allow the expansion of air during melting. As seen in FIGS. 7(a) and (b) and 8, phase change material pellet 1 was made having an overall size 30 mm dia. and 12 mm height. Void space 2 was defined by void base 6 and void walls 3. Pellet lid 11, having wall 10, is complementary dimensioned to pellet lid lip 4, thereby sealing void space 2. This formed void space 2 of about 34 to 35% to account for the volume change during phase change material melting. Additionally, a eutectic of $Li_2CO_3$ and $Na_2CO_3$ salts or chloride salts were prepared and characterized having void spaces between 20% and 35% to allow for expansion of air during melting. The sizes of these pellets were in the range of 10-13 mm dia.

The phase change material pellets were encapsulated by depositing a primary layer of polyimide (PI) as discussed above, which was followed by using self-assembly reaction for depositing silicon dioxide ($SiO_2$) layer on top of the polyimide layer. The encapsulated pellets prepared using electroless deposition was tested for high temperature stability by heating them above the melting point of the PCM. The capsules were tested for cyclic stability by heating from room temperature to 350° C. at heating rate of 4° C./min, a dwell time of 2 hours at 350° C. and then cooled to 280° C., thus completing the first cycle. It was found that the PCM leaked from the capsule after 3rd cycle for the capsules with PI/silicon dioxide coating, which is assumed to be caused by non-uniform coating of PI/silicon dioxide layer as the coating was performed manually. Therefore a mixture of PI and SiC (silicon carbide) was prepared and manually coated on the PCM pellet, and followed by silicon dioxide coating. The mixture of PI/SiC provided a rough surface for proper deposition of silicon oxide. The pellet was cured in the oven at 250° C. for 30 minutes. The capsule prepared in this manner survived for four cycles before leakage.

Example 5

Experiments were also performed to reduce the air pressure in the pellets by inserting a metal wire during fabrication of the pellet followed by coating of the pellet with PI/SiC and $SiO_2$. Phase change material pellets were formed, as disclosed in Example 5, with the exception of a metal wire inserted into void base 6 of each pellet. The void space was sealed and the phase change material pellets heated to 200° C. The wire was immediately removed and the pellet was sealed with PI/SiC. The pellets were then cured as disclosed above and coated in metal oxide.

Figure 9:
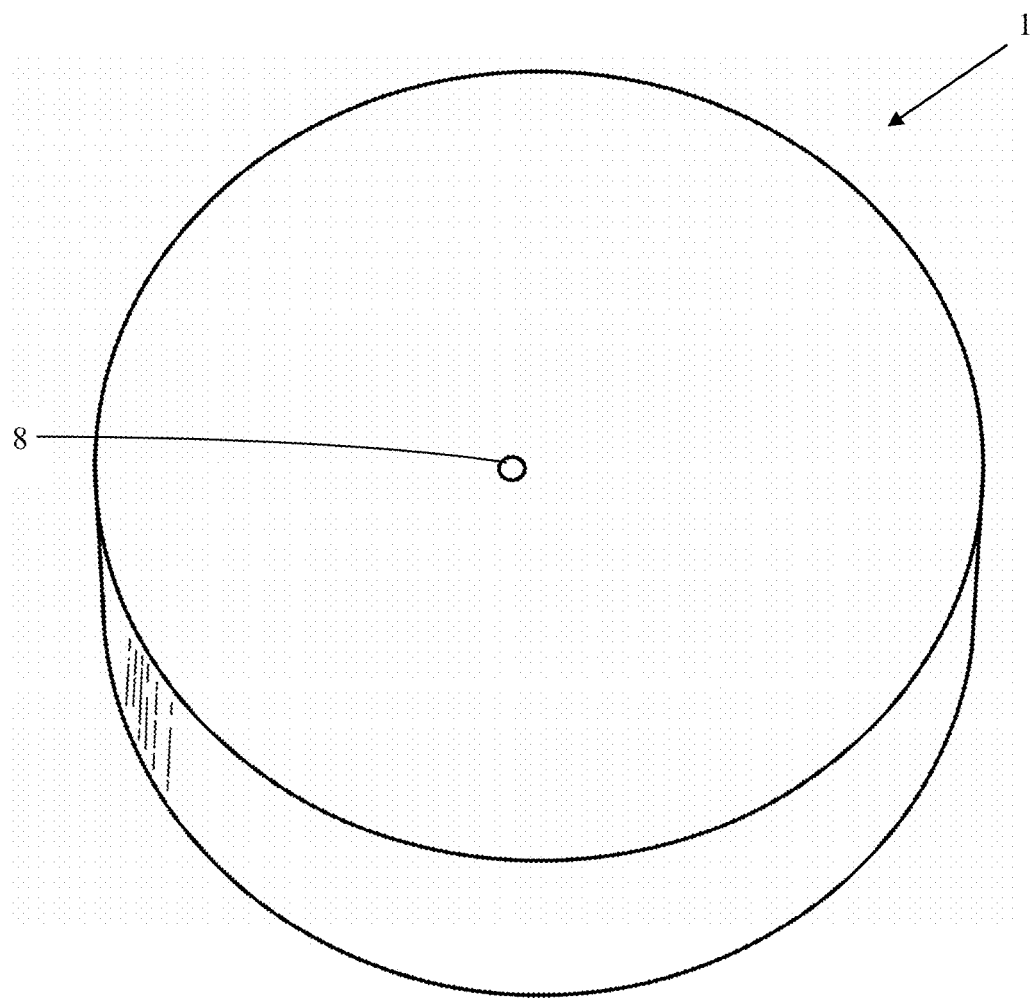
FIG. 9 is an illustration of a pin-hole phase change materials pellets containing voids formed by inserted metal wire in the pellet during curing.

FIG. 9 shows the pictures of pellets with pin hole which was created to remove some air from the encapsulated pellet. The evacuated pellet was subjected to thermal cycling, and survived for seven cycles before any leakage of the phase change material was observed. This showed that reducing the air pressure inside the pellet helped in achieving a greater number of cycles. It is known in the art that adjusting the void space and/or vacuum may be utilized, along with varied number of layers and composition of PI/SiC. Other coating materials such as graphene, carbon black, and graphite along with PI can be spray coated to achieve uniform coating, to optimize the encapsulation process.

Example 6

Figure 10:
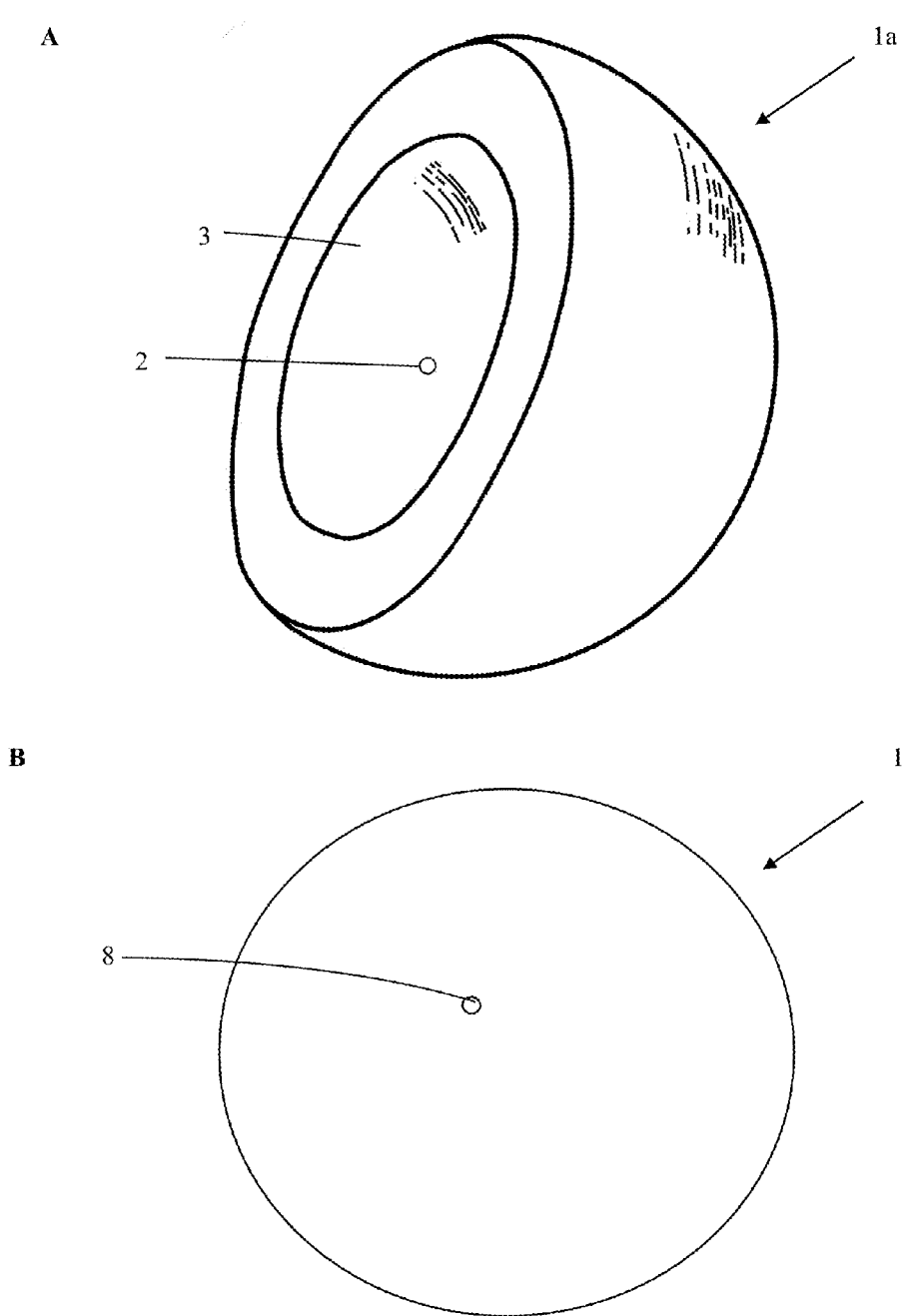
FIGS. 10(a) and (b) are illustrations of phase change material pellets as spheres, containing void space. (A) shows a spherical hemisphere, prior to fusion of two hemispheres, whereas (B) shows a pin-hole in the void, spherical phase change material pellets containing voids.

The cylindrical pellets eventually failed, possibly due to stress concentration at the sharp edges. Therefore, spherical pellets were prepared using hemispherical pellet halves having a void in the center by pressing the sodium nitrate powder in a die. Two spherical pellet hemispheres 1a were formed with a diameter of 26 mm. Void walls 3 define void 2, having a diameter of 16 mm, as shown in FIG. 10(a). Phase change material pellet 1 was formed by fusing the two hemispheres together with any known sealant, such as polyimide. To address air pressure in the void, a pinhole was optionally drilled in one half of the pellet to permit air escape during and after heating, as shown in FIG. 10(b). The drilled and undrilled hemispheres were joined together with a polyimide and silicon carbide mixture, and the joint was cured in a furnace and allowed to sit in the furnace at high temperature. During this cure, the pinhole was open which permitted air inside the void to escape at this higher temperature. After curing, the pinhole was closed with the polyimide and silicon carbide mixture later, which created vacuum in the sphere upon cooling. The pellets were then coated using a spray coating method. A PI/SiC coating was diluted to lower the viscosity for the industrial process, and applied. Due to the diluted PI solution, some pellets with high porosity reacted with the solvent upon curing, whereas some pellets did not react during the curing procedure. It was thought that the solvent had been taken out of these pellets during curing. During thermal cycling of the pellets, it was found that the salt, which had leaked out of the pellet, was black in color, indicating solvent was still present.

Example 7

The reactivity of the PI with the molten $NaNO_3$ plays an important role especially keeping in mind the sustainability of the $NaNO_3$ capsules over a number of heating and cooling cycles. The reactivity of the PI-metal oxide coating with the $NaNO_3$ is studied by characterizing the coatings using FTIR and SEM on different samples.

Fourier Transform Infra-Red Spectroscopy (FTIR)

Pellets of potassium bromide (KBr) are used as KBr is transparent to IR radiation. A sample of KBr pellet was coated with the precursor solution and cured by heating to 250° C. and 300° C. The FTIR analysis indicated the absence of reaction between the KBr and the coating, up to temperatures of 300° C. The test was repeated with $NaNO_3$ and the coating material on a glass slide which confirmed that there is no reaction between the coating solutions and $NaNO_3$.

Figure 11:
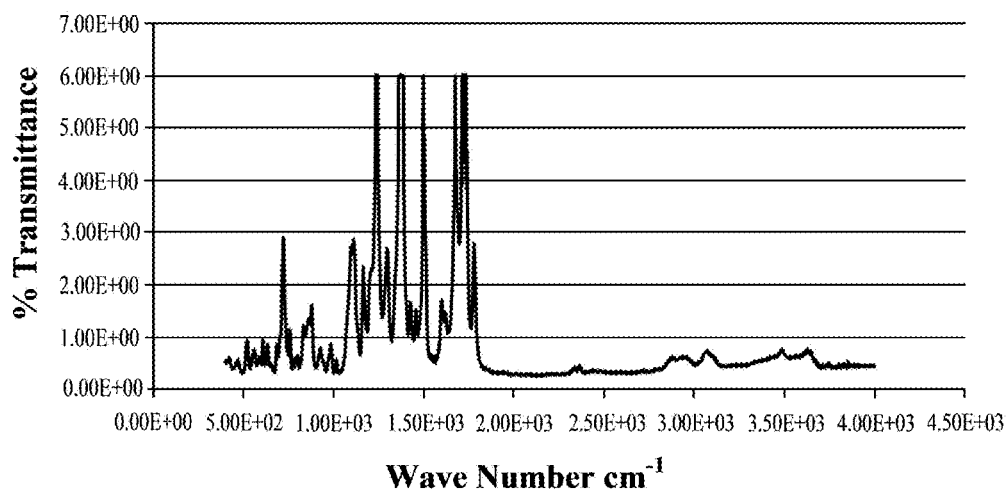
FIGS. 11(a) and (b) are graphs of FTIR results for PI-coated KBr pellets measured at room temperature.
Figure 11:
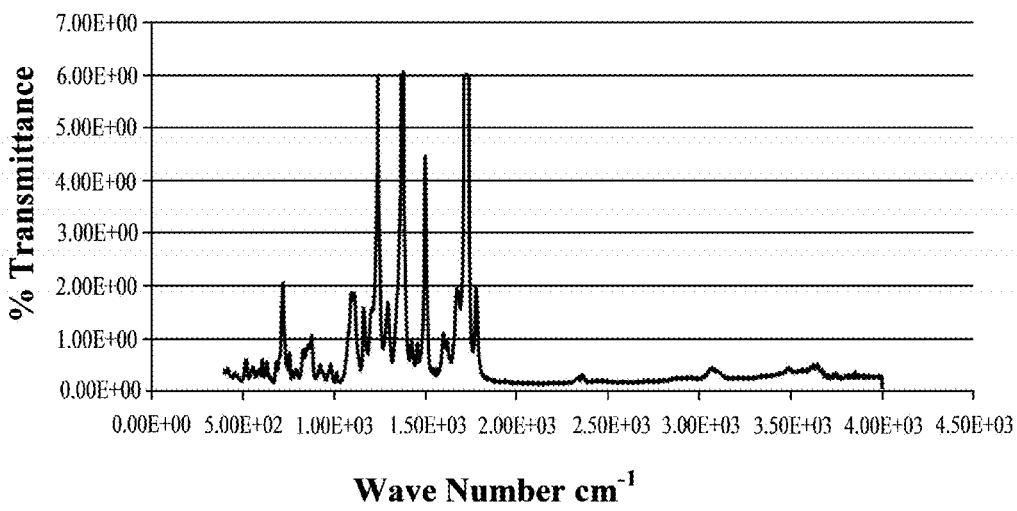

The readings for potassium bromide (KBr) were taken as it is transparent to IR radiation. A KBr sample was formed, coated with PI, and cured by heating to 250° C. and 300° C. The results obtained in the FTIR analysis as shown in FIGS. 11(a) and (b) indicate the absence of reaction between the KBr and the PI, up to temperatures of 300° C.

Figure 12:
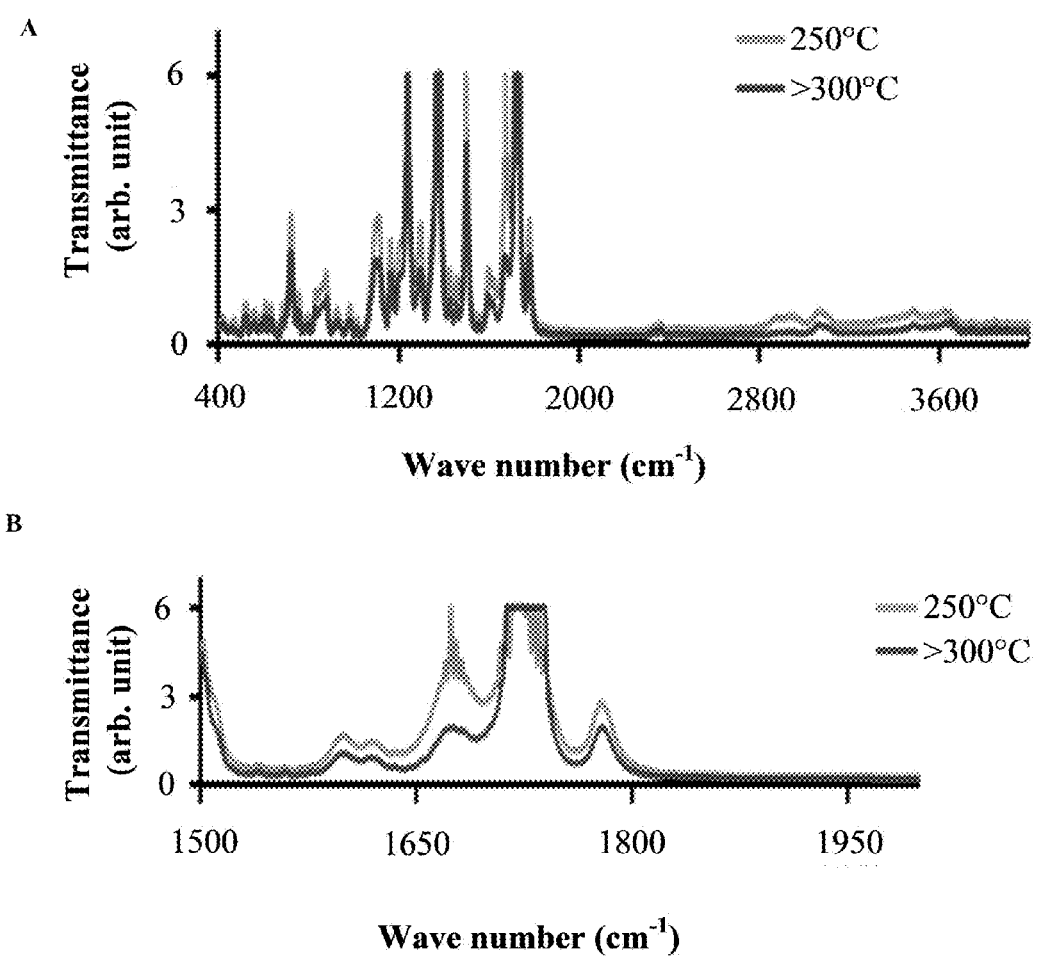
FIGS. 12(a) and (b) are graphs of FTIR results on reaction of PI with $NaNO_3$ pellets measured at room temperature.

To test the reactivity of $NaNO_3$ with PI, another set of FTIR studies are performed. The samples were made by coating a glass slide with PI solution, curing it, and then melting the $NaNO_3$ powder (refined grade) on the PI coated glass slide. The change in the surface characteristics of the sample was compared with initial PI characteristics. From the FIG. 12(a), C=O and C—N stretching modes between 1700 and 1800 $cm^{-1}$ can be observed. Imide carbonyl band—near 1720-1760 $cm^{-1}$ absorbs strongly. Stretching region, seen zoomed for clarity in FIG. 12(b), indicates that in addition to ring-closed imides, some intermolecular links are formed, but no reaction found with $NaNO_3$. The thermal stability of polymer is achieved by rigid aromatic rings and heterocyclic moieties into the polymer backbone.

Thermogravimetric Analysis (TGA)

Figure 13:
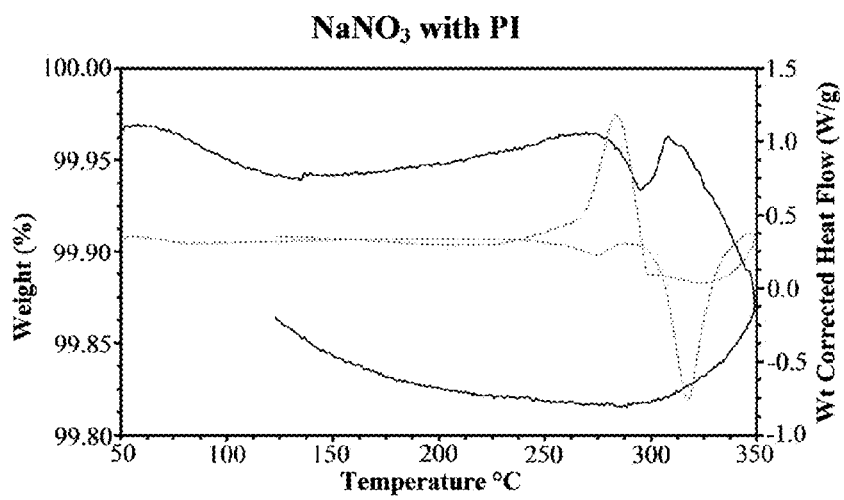
FIG. 13(a)-(c) are graphs of TGA Results for $NaNO_3$ with PI coating. Results were obtained using a SDT Q600 (TA Instruments Inc., New Castle, Del.). (A) and (b) the dashed line indicates heat flow, whereas the solid line indicates weight.
Figure 13:
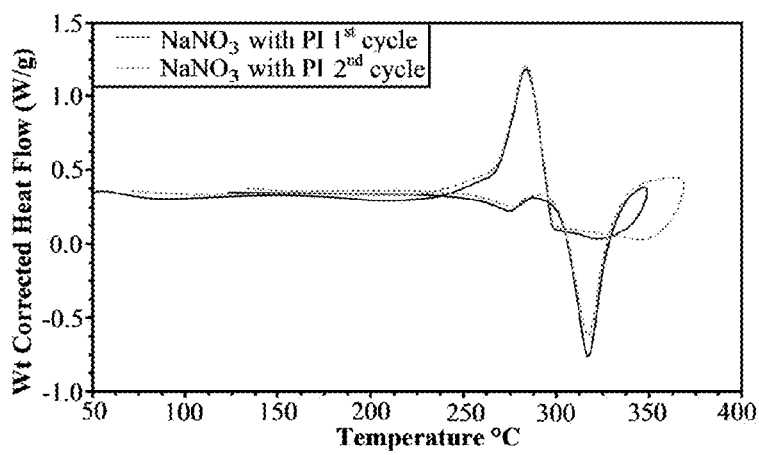
Figure 13:
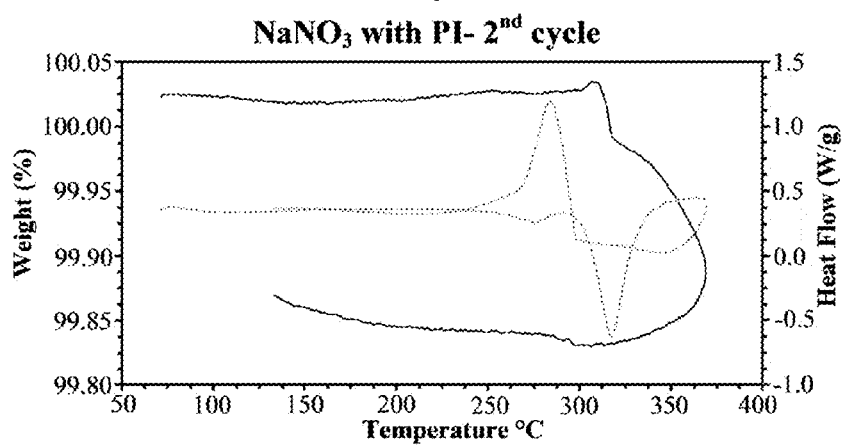

The $NaNO_3$ prills (refined grade) and the small particles of the compressed pellet were coated with PI and cured by heating to 250° C. at the rate of 4° C. per minute. The TGA was performed. The sample was loaded onto a balance and heated in a furnace to between 350° C. and 400° C. The results are presented in FIGS. 13(a)-(c). G. FIG. 13(a) indicates cycle 1 and FIG. 13(b) refers to cycle 2. FIG. 13(c) gives the overlay of heat flow in two cycles. These results indicate very minimum heat and weight losses, recommending no reaction occurring between the molten $NaNO_3$ and the PI, also, the minimum weight loss supports the idea that there are no reactions occurring which result in gaseous products formation. The weight loss present can be attributed to the moisture present in the $NaNO_3$, as approximately same weight losses are observed with the plain $NaNO_3$ samples.

Scanning Electron Microscopy (SEM) and Energy Dispersive X-Ray (EDX) Analysis

The coating of SiC and PI (weight ratio 0.2:1) was applied to the spherical pellets prepared with the void space of about 34%. Nickel powder was used to seal the void and the $NaNO_3$ pellets coated with multiple layers of PI and SiC. The pellets were cured by heating the samples to 250° C. at 4° C. per minute. After the samples are prepared they are heated to 350° C. and EDX and SEM results obtained.

The pellets were bombarded with an electron beam inside the scanning electron microscope, ejecting some of electrons from the pellet sample, forming a vacated electron position that is occupied by an outer shell electron. The emitted X-ray from the high-energy electron was measured, thereby identifying atoms of the pellet. EDX results are shown in FIG. 4 and they show the presence of only Na, N, O and C suggesting that no other element is present.

Figure 14:
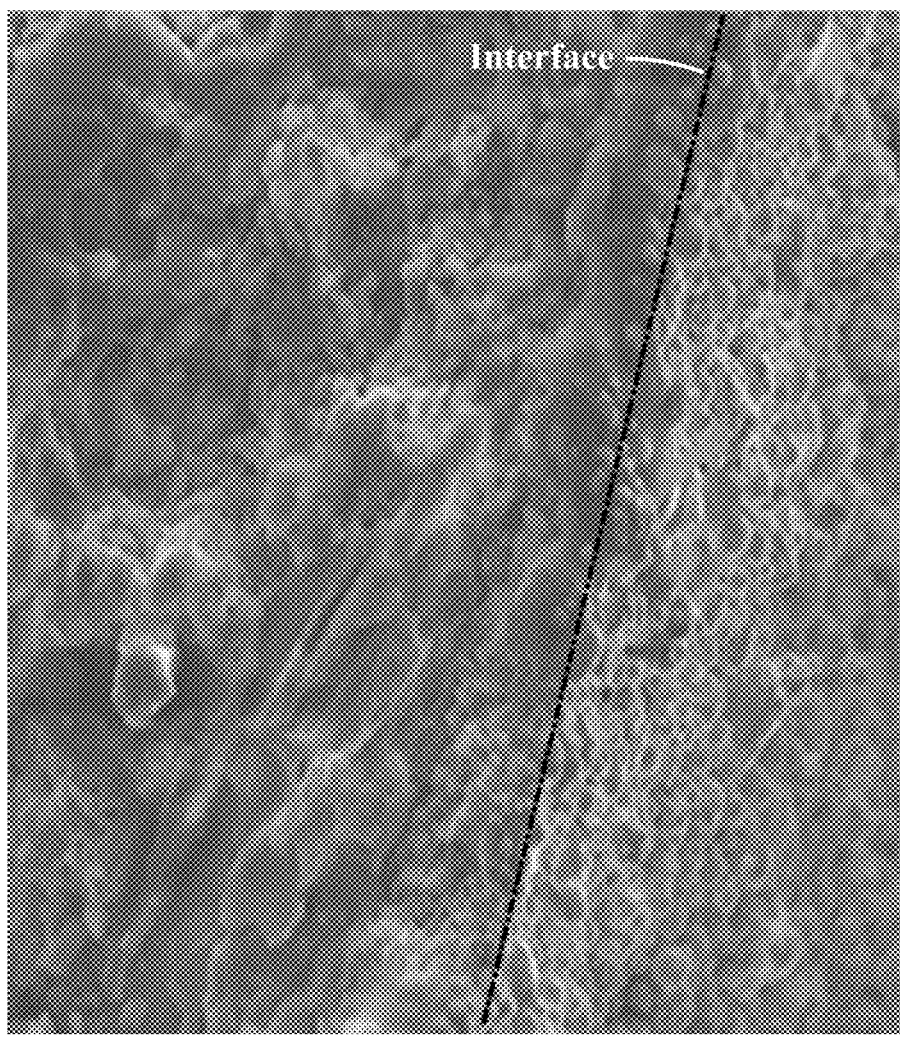
FIG. 14 is an image showing scanning electron microscope (SEM) Analysis of the phase change materials-coating interface.
Figure 15:
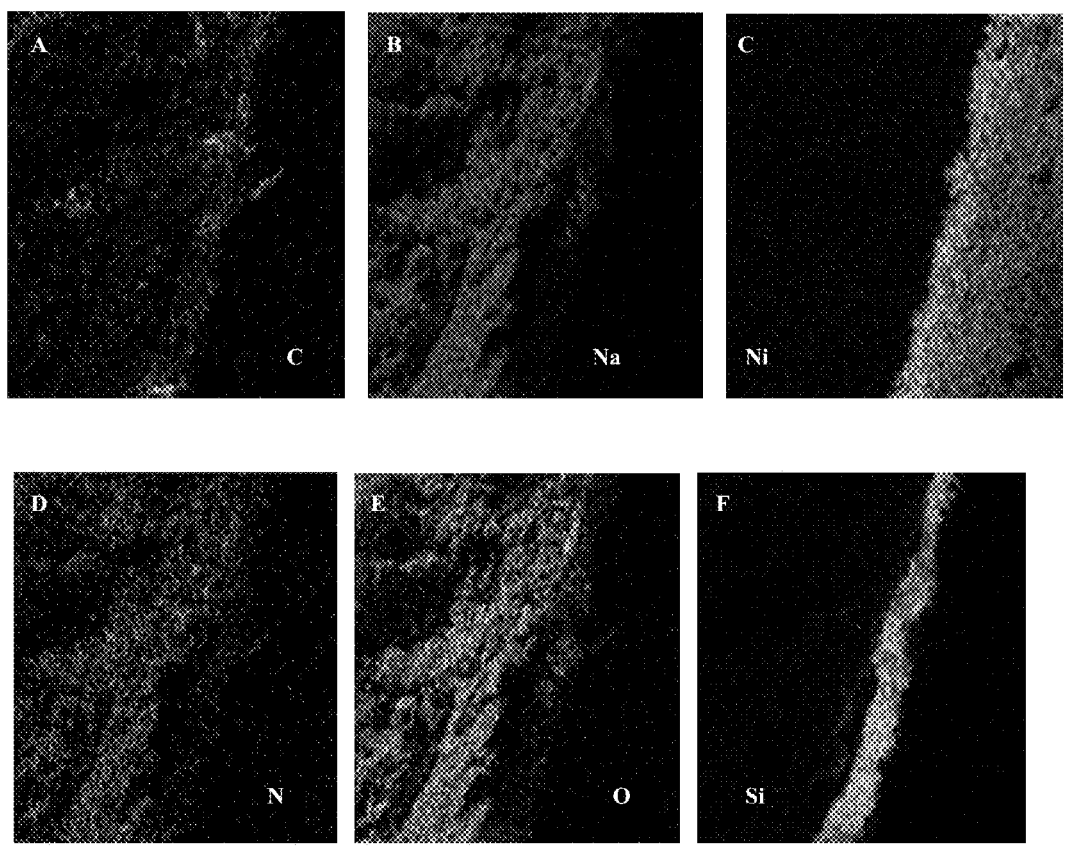
FIGS. 15(a)-(f) are images showing scanning electron microscope (SEM) Analysis of the phase change materials with coatings showing the presence of (a) carbon; (b) sodium; (c) nickel; (d) nitrogen; (e) oxygen; and (f) silicon.

SEM imagery showed the elemental composition at the $NaNO_3$-coating (PI, SiC and Ni) interface. The interface showed a clean differentiation between the phase change material and the coating, seen in FIG. 14. Analysis of the coated pellet indicated no other elemental composition was present except for the PI, SiC, Ni, and $SiO_2$ coating and $NaNO_3$ core, as seen in FIGS. 15(a)-(f).

While it is noted that these tests indicate the coating solutions and the salt do not react during the test period, the materials must be studies under extended cycling. However, based on the tests performed, it is anticipated that the coating solutions will not react with the salt.

Thermal Cycling

Figure 16:
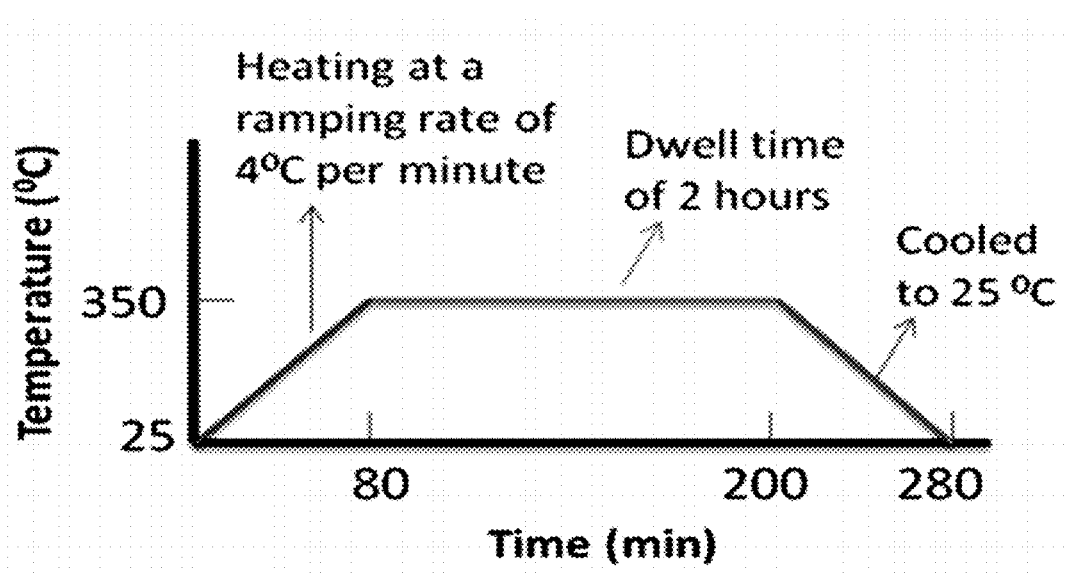
FIG. 16 is a graph showing the heating and cooling cycle for the phase change materials with coatings.

The performance and efficiency of the encapsulation coatings was verified through heating and cooling cycles in a furnace, as shown in FIG. 16. Testing of cylindrical $NaNO_3$ capsules prepared using the above encapsulation method were able to withstand up to 7 heating and cooling cycles, with non-uniformity of the coating the reason for early failure.

A novel encapsulation procedure for $NaNO_3$, with a metal oxide, such as $SiO_2$, for use in a thermal energy storage system with an operating temperature range of 300° C. to 500° C. has been developed. The $NaNO_3$ pellets were coated in polymer such as, PI (stable up to 500° C.) and cured, so that the $NaNO_3$ pellets become insoluble in water as well as several organic solvents. The metal oxide is coated over such $NaNO_3$ pellets with PI coating using self-assembly, hydrolysis, and simultaneous chemical oxidation at various temperatures. The $NaNO_3$ capsules were characterized using FTIR, TGA, and SEM. These capsules were able to withstand up to 7 heating and cooling cycles. Upon examination, the reason for failure was determined to be non-uniformity of the coating. When incorporated in a TES system, the encapsulated PCMs can result in a substantially lower cost storage system.

Example 8

$NaNO_3$ pellets were made either by using power press or by using a pelletizer, with the final pellets having cylindrical, spherical, oblong, or other geometrical shapes.

A polyimide (PI 2525 or PI 2611) coating was applied onto $NaNO_3$ pellets. The polyimide was mixed with varying amounts of N-methyl 2-pyrrolidinone (NMP), which is a plasticizer organic solvent, for one hour. A thin layer of the NMP and polyimide mixture was coated on the $NaNO_3$ pellets by dip coating, spray coating, or brushing, and cured at temperatures of 100 to 120° C. Later, the pellets were heated to a temperature of 250° C. for two hours at a rate of 4° C. per minute, thereby making the pellets insoluble in water and many organic solvents, such as methanol, isopropyl alcohol, ether, acetonitrile, acetone etc. The insolubility of the salt is important for encapsulating the metal oxide in a liquid environment.

A $SiO_2$ layer was then self-assembled over the surface of the PCM salt, using the following chemicals: tetraethyl orthosilicate (TEOS), 3-aminopropyltriethoxy silane, ethanol, hydrochloric acid, sodium hydroxide. Five to 10 ml of TEOS was added to 1 to 2 ml of silane solution, and mixed thoroughly, while 20 ml of ethanol, 1M sodium hydroxide, and 0.02M hydrochloric acid are kept separately in different containers. Due to the presence of silane, TEOS was self-assembled on the polyimide coating. The polyimide coated pellets were heated to 200° C. on a hot plate. The pellets were wetted by the TEOS and silane mixture. The pellets were then immediately treated by alcohol combined with 0.02M hydrochloric acid.

TEOS hydrolyzed immediately at a high temperature. The pellets were allowed to cool and then were treated with NaOH, followed by immediately transferring the pellet to a hot environment with a temperature of 250° C. There is a continuous reaction at the molecular level with NaOH, alcohol, and TEOS formed $Si(OH)_4$ and later $SiO_2$. A thin layer of $SiO_2$ having white color eventually developed on the pellets. This procedure was repeated several times for obtaining the optimum thickness over the PCM pellets, as seen in Table 3.

TABLE 3

Polymer coating thickness was measured with the aid of a Leitz optical microscope.

| coating | thickness range (µm) |
|---|---|
| polymer-uncured | 400-450 |
| polymer-cured | 150-350 |
| $SiO_2$-polymer coated pellets | 20-35 |

The method disclosed above may also involve a step of taking the polyimide-coated pellets and further coating them with nickel powder by rolling the $NaNO_3$ pellets over a nickel powder. The $SiO_2$ coating was then applied over the nickel-coated polyimide $NaNO_3$ pellets, as discussed above.

Alternatively, the $SiO_2$ layer may be replaced with a graphene-$SiO_2$ sol-gel suitable to coat the $NaNO_3$ pellets. Graphene was added to the $SiO_2$ precursor, such as TEOS, and the polyimide-coated $NaNO_3$ pellet was dip coated at room temperature into the sol-gel. The sol-gel coated pellets were allowed to dry at room temperature and later heated to 250° C. at a rate of 4° C. per minute. Upon reaching the curing temperature of 250° C., the polyimide was cured over the pellets for two hours.

Alternative exterior coatings may replace the $SiO_2$ layer over $NaNO_3$, such as $TiO_2$, ZnO, CaO, BaO, $TiO_2$—$SiO_2$, $CeO_2$, $Fe_2O_3$, $Al_2O_3$, MgO, etc., as coatings, and various PCMs, such as NaCl, NaOH, KOH, $CaCO_3$, $NaCO_3$, KCl, $NaNO_3$, etc., as the pellets.

In the preceding specification, all documents, acts, or information disclosed does not constitute an admission that the document, act, or information of any combination thereof was publicly available, known to the public, part of the general knowledge in the art, or was known to be relevant to solve any problem at the time of priority.

The disclosures of all publications cited above are expressly incorporated herein by reference, each in its entirety, to the same extent as if each were incorporated by reference individually.

While there has been described and illustrated specific embodiments of a thermal energy storage material, it will be apparent to those skilled in the art that variations and modifications are possible without deviating from the broad spirit and principle of the present invention. It is intended that all matters contained in the foregoing description or shown in the accompanying drawings shall be interpreted as illustrative and not in a limiting sense. It is also to be understood that the following claims are intended to cover all of the generic and specific features of the invention herein described, and all statements of the scope of the invention which, as a matter of language, might be said to fall therebetween.

What is claimed is:

1. A method of manufacturing a thermal energy storage material, comprising the steps:
   providing a phase changing salt pellet, wherein the phase changing salt pellet is inorganic;
   coating the exterior surface of the phase changing salt pellet in a polyimide coating;
   wherein the polyimide coating comprises polyimide and a surface roughener disposed in the polyimide coating, where the surface roughener is nickel, silicon carbide, or carbon;
   curing the polyimide coating; and
   encapsulating the exterior of the polyimide coating with a metal oxide or a graphene-metal oxide composite.

2. The method of claim 1, wherein the phase changing salt pellet is aluminum phosphate, ammonium carbonate, ammonium chloride, caesium carbonate, caesium sulfate, calcium citrate, calcium carbonate, calcium chloride, calcium hydroxide, calcium oxide, calcium phosphate, calcium saccharate, calcium sulfate, cerium phosphate, chromic chloride, iron phosphate, lithium carbonate, lithium sulfate, magnesium chloride, magnesium sulfate, manganese chloride, manganese nitrate, manganese sulfate, potassium acetate, potassium carbonate, potassium chloride, potassium hydroxide, potassium phosphate, rubidium carbonate, rubidium sulfate, disodium tetraborate, sodium acetate, sodium bicarbonate, sodium bisulfate, sodium borate, sodium carbonate, sodium citrate, sodium chloride, sodium hydroxide, sodium nitrate, sodium percarbonate, sodium persulfate, sodium phosphate, sodium propionate, sodium selenite, sodium silicate, sodium sulfate, sodium tellurate, sodium tetraborate, sodium thiosulfate, strontium hydrophosphate, zinc acetate, zinc chloride, eutectic of $Li_2CO_3$ and $Na_2CO_3$, or a combination thereof.

3. The method of claim 1, wherein phase changing salt pellet is made either by using power press or a pelletizer.

4. The method of claim 1, wherein the polyimide coating is cured at up to 250° C. for 2 hours.

5. The method of claim 4, wherein the polyimide coating is cured at a temperature of between about 220° C. and about 250° C. for 2 hours.

6. The method of claim 1, wherein the polyimide coating is coated further comprising the steps:
 mixing the polyimide with N-methyl 2-pyrrolidinone and a plasticizer organic solvent;
 applying a thin layer of the NMP+polyimide mixture onto the phase changing salt pellet by dip coating, spray coating, or brushing; and
 curing the polyimide layer.

7. The method of claim 4, further comprising heating the phase changing salt pellet up to 250° C. for 2 hours at 4° C./min.

8. The method of claim 1, further comprising:
 adding an additive to the polyimide prior to coating the exterior surface of the phase changing salt pellet in a polyimide,
 wherein the additive is nickel powder, silicon carbide, or carbon.

9. The method of claim 1, wherein the metal oxide encapsulant is silicon dioxide, titanium dioxide, zinc oxide, calcium oxide, barium oxide, titanium dioxide-silicon dioxide composite, cerium dioxide, iron (III) oxide, aluminum (III) oxide, magnesium oxide, lithium cobalt dioxide, lithium nickel dioxide, zinc oxide, zirconium dioxide, lithium, titanium oxide, lithium aluminum manganese oxide, lithium nickel manganese oxide, lithium dimanganese tetraoxide, indium tin oxide, or combinations thereof.

10. The method of claim 9, wherein the exterior of the polyimide coating is encapsulated in silicon dioxide or a graphene-silicon dioxide composite, further comprising the steps:
 obtaining a sol-gel silicon dioxide precursor, wherein the sol-gel silicon dioxide precursor is tetraethyl orthosilicate or tetraethyl orthosilicate containing graphene;
 mixing the sol-gel silicon dioxide precursor with 3-aminopropyltriethoxy silane to form a silicate precursor;
 placing the polyimide-coated phase changing salt pellets into the silicate precursor;
 heating the silicate precursor;
 adding ethanol and hydrochloric acid to the silicate precursor;
 permitting the silicate precursor to hydrolyze for about 5 to about 10 minutes;
 neutralizing the silicate precursor with sodium hydroxide; and
 permitting the sol-gel silicon dioxide precursor to encapsulate the polyimide coated phase changing salt pellet.

11. The method of claim 10, wherein the sol-gel graphene-silicon dioxide precursor is cured at 250° C. at a rate of 4° C./minute for two hours.

12. The method of claim 1, further comprising:
 forming a void space in the phase changing salt pellet prior to polyimide coating, wherein the void space is formed by drilling, briquetting, or die casting the pellet with a void space.

13. The method of claim 12, further comprising:
 reducing the pressure in the void space, comprising:
 inserting a metal wire into the phase changing salt pellet during fabrication of the pellet;
 heating the phase changing salt pellet;
 removing the metal wire from the phase changing salt pellet;
 permitting heated gases to escape from the void space; and
 applying the polyimide coating to the phase changing salt pellet to seal the void space.

14. The method of claim 1, further comprising functionalizing the surface of the phase changing salt pellet, comprising:
 soaking the phase changing salt pellet in a solution of hexane and silane for 24 hours prior to applying the polyimide coating to the phase changing salt pellet.

* * * * *